United States Patent
Coutenay et al.

[15] 3,635,242
[45] Jan. 18, 1972

[54] VALVE SEIZURE PROTECTION DEVICES

[72] Inventors: Jerzy Leon Coutenay; John Richard Simmons, both of Wolverhampton, England

[73] Assignee: H. M. Hobson Limited, London, England

[22] Filed: July 10, 1970

[21] Appl. No.: 53,926

[52] U.S. Cl. ............................. 137/554, 137/625.69
[51] Int. Cl. ........................... F16k 37/00, F16k 11/07
[58] Field of Search .................. 251/79, 80; 244/75, 85; 137/554, 625.69

[56] References Cited

UNITED STATES PATENTS

| | | | |
|---|---|---|---|
| 1,383,432 | 7/1921 | Simon | 251/80 |
| 1,425,412 | 8/1922 | Norwood | 251/80 |
| 2,824,712 | 2/1958 | Rasmussen et al. | 244/85 X |
| 2,961,199 | 11/1960 | Brannin et al. | 244/85 X |
| 3,216,454 | 11/1965 | Richter et al. | 137/625.69 |
| 3,253,613 | 5/1966 | Richolt | 137/625.69 X |

*Primary Examiner*—Henry T. Klinksiek
*Attorney*—Martin Kirkpatrick

[57] ABSTRACT

A hydraulic actuator of the type specified for operating a flying control surface of an aircraft, which includes mechanism responsive to operation of the pilot's input member in the event of seizure of the control valve to operate a warning device.

3 Claims, 1 Drawing Figure

PATENTED JAN 18 1972 3,635,242
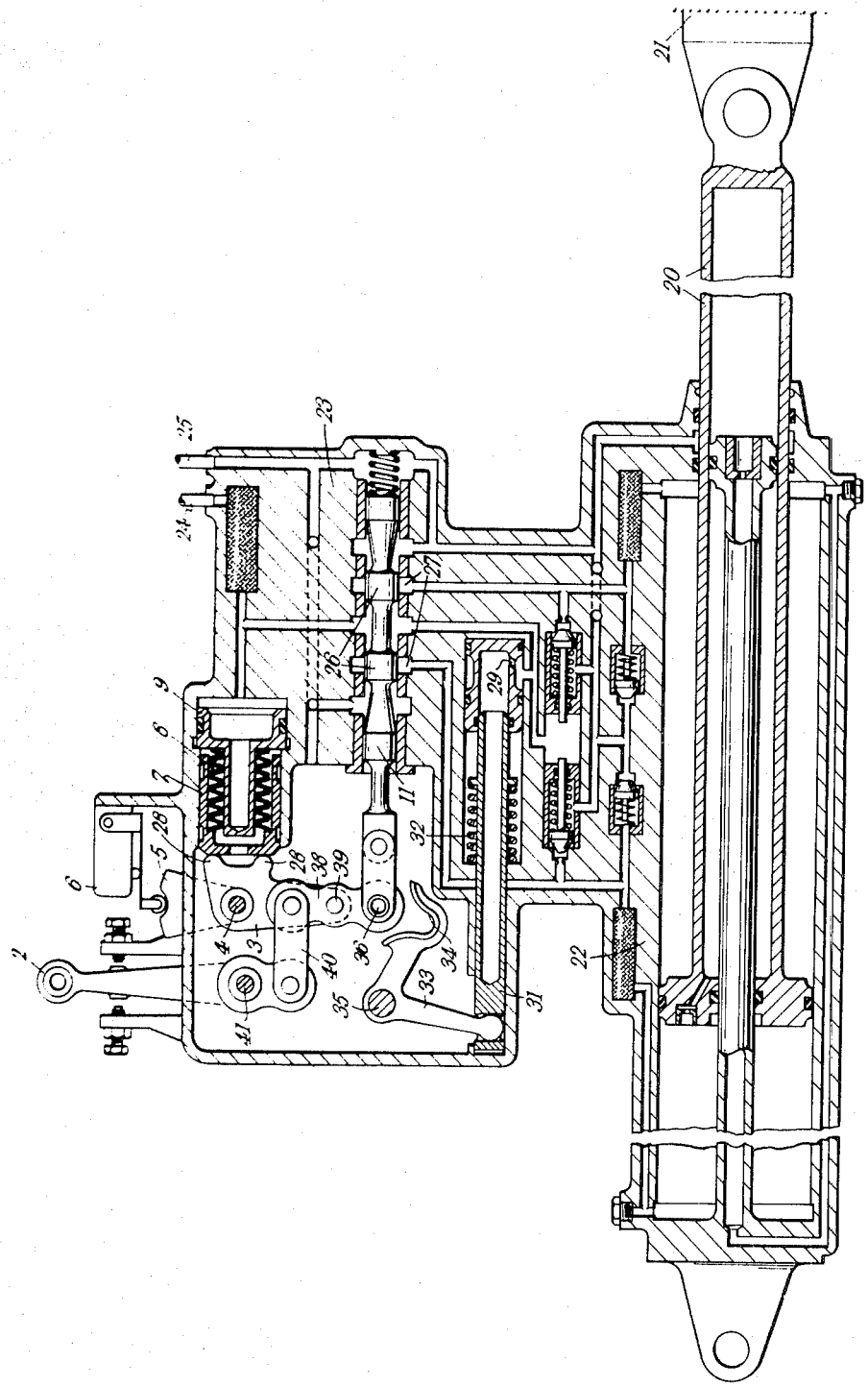

VALVE SEIZURE PROTECTION DEVICES

This invention is concerned with a hydraulic actuator, for operating a flying control surface of an aircraft, of the type comprising a piston and cylinder assembly, one component of which is attachable to the aircraft structure to serve as a stationary component and the other of which is a movable component attachable to the control surface, and a control valve which is movable by a pilot's input member from a neutral position to connect opposite ends of the cylinder to pressure and exhaust and thereby to effect relative displacement of the components of the piston and cylinder assembly to move the control surface to a position determined by the displacement imparted by the pilot to the input member.

It is normal to duplicate such actuators so that the pilot may, in the event of failure of one actuator, retain control over the control surface through the agency of the other actuator. If, however, the control valve of one actuator seizes the defective actuator may exert on the control surface a thrust opposing that exerted by the pilot on the control surface through the other actuator.

With a view to obviating this disadvantage, the invention provides a hydraulic actuator of the above type which includes mechanism responsive to operation of the pilot's input member in the event of seizure of the control valve of the actuator to operate a warning device, e.g., a lamp in the pilot's cabin. This will enable the crew to depressurize the seized actuator and so prevent it from exerting any thrust detracting from the effort available from other actuators operating the control surface. The depressurization may be carried out manually or automatically. A valve centering device may also be incorporated for the purpose described below.

One embodiment of the invention is illustrated in the accompanying diagrammatic drawing, which shows a hydraulic actuator comprising a piston 20 connected at its right-hand end to a fixed portion 21 of the aircraft structure and a movable cylinder 22 attachable at its left-hand end to a flying control surface, not shown. Attached to or integral with the cylinder is a housing 23, in which is disposed a control valve 11, which is movable in opposite directions from the neutral position shown by a pilot's input lever 2 to connect one end of the cylinder 22 to a pressure inlet 24 and the other end of the cylinder to an exhaust outlet 25; the cylinder moving in the same direction as the direction of displacement of the control valve 11 until lands 26 on the valve again seal ports 27 leading to the ends of the cylinder.

The pilot's input lever 2 is pivoted on a fixed pivot 41 and is connected by a link 40 to a lever 38 pivoted by a pin 39 to a normally stationary lever 3 and by a pin 36 to the control valve 11. Normally, movement of the input lever 2 will rock the lever 38 about the pivot 39 to move the valve 11 to connect opposite ends of the cylinder 22 to pressure and exhaust, so causing movement of the cylinder 22 to actuate the control surface as already described. So long as the valve 11 can move, the lever 3 is restrained from rocking in either direction about a fixed pivot 4 by prongs 28 on the lever 3 which bear against a plunger 7 loaded by a spring 8 which is backed up by a piston 9 to pressure from the inlet 24.

If the valve 11 seizes at any point of its operating stroke, the pivot 36 will be held stationary and movement imparted to the lever 38 by the input lever 2 will exert a torque on the lever 3 about the pivot 4. When the preload on the plunger 7 from the spring 8 is exceeded, the lever 3 will be rotated and a microswitch 6 will be actuated by a cam lever 5 which is fixed to the lever 3. The microswitch 6 is positioned externally and when actuated it provides an electrical indication of a seized valve. On depressurization the piston 9 will move and the spring 7 will be unloaded and thus remove a large proportion of the force felt by the pilot in operating the input lever 2.

So long as the actuator is pressurized, pressure from the inlet applied through an orifice 29, urges a plunger 31 to the position illustrated, thereby maintaining a lever 33, pivoted on a fixed pivot 35, in a position in which a fork 34 on the lever is held clear of the valve pin 36.

When the actuator is in the unpressurized state, a spring 32 retracts the piston 31 to bring the lever 33 into a position in which its fork 34 engages the valve pin 36 to hold the valve 11 in its neutral position. When supply pressure is applied, the piston 31 extends, the lever 33 pivots about the pivot 35 and the fork 34 is pulled away from the valve pin 36 to permit normal operation as shown in the drawing.

This valve centering device enables the valve seizure detector to be tested since any deflection of the input lever when the actuator is unpressurized will cause operation of the microswitch as described above.

The detector will thus detect and record a valve seizure upon a further demand being initiated by the pilot. The valve centering arrangement allows an in situ check of the correct functioning of the seizure detection mechanism prior to pressurization.

The valve centering device following depressurization allows a measure of gust damping when the aircraft is parked.

What we claim as our invention and desire to secure by Letters Patent is:

1. A hydraulic actuator, for actuating a flying control surface of an aircraft, comprising a pilot's input lever, a piston and cylinder assembly, one component of which is attachable to the aircraft structure to serve as a stationary component and the other of which is a movable component attachable to the control surface, a control valve pivoted to the pilot's input lever and movable thereby from a neutral position to connect opposite ends of the cylinder to pressure and exhaust and thereby to effect relative displacement of the components of the piston and cylinder assembly to move the control surface to a position determined by the displacement imparted by the pilot to the input member, a switch, another lever pivoted to the pilot's input lever, a spring which normally opposes pivoted movement of the other lever, said spring yielding in the event of seizure of the control valve to permit pivotal movement of the other lever by the pilot's input lever to actuate the switch, a piston maintained by hydraulic pressure when the actuator is pressurized in position to back said spring and thereby render said spring effective to oppose pivotal movement of said other lever, said piston yielding to disable said spring and prevent it from opposing pivotal movement of such other lever when the actuator is depressurized and a warning device operable by actuation of said switch.

2. An actuator as claimed in claim 1, comprising a centering device for retaining the control valve in its neutral position when the actuator is depressurized.

3. An actuator as claimed in claim 2, in which the centering device includes a forked lever adapted to engage a pin on the control valve when the latter is in neutral position, a piston for urging the lever to maintain the fork out of contact with the pin so long as the actuator is pressurized and a spring for moving the lever to engage the fork with the pin when the actuator is depressurized.

* * * * *